(12) United States Patent
Bossi

(10) Patent No.: US 11,362,374 B2
(45) Date of Patent: Jun. 14, 2022

(54) SYSTEM AND METHOD FOR STORING A BATTERY

(71) Applicant: Robert Bosch GmbH, Stuttgart (DE)

(72) Inventor: Davide Bossi, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 16/463,406

(22) PCT Filed: Nov. 8, 2017

(86) PCT No.: PCT/EP2017/078523
§ 371 (c)(1),
(2) Date: May 23, 2019

(87) PCT Pub. No.: WO2018/095726
PCT Pub. Date: May 31, 2018

(65) Prior Publication Data
US 2019/0312314 A1    Oct. 10, 2019

(30) Foreign Application Priority Data
Nov. 24, 2016   (DE) ................... 10 2016 223 251.7

(51) Int. Cl.
*H01M 10/42* (2006.01)
*H01M 10/44* (2006.01)
(Continued)

(52) U.S. Cl.
CPC ......... *H01M 10/425* (2013.01); *H01M 10/44* (2013.01); *H01M 10/441* (2013.01);
(Continued)

(58) Field of Classification Search
CPC .. H01M 10/425; H01M 10/44; H01M 10/441; H01M 10/46; H01M 10/48; H01M 2010/4271; H01M 2010/4278; H01M 50/20; H02J 7/0013; H02J 7/0022; H02J 7/0069; Y02E 60/10; Y02T 10/70
See application file for complete search history.

(56) References Cited

U.S. PATENT DOCUMENTS

| 2011/0043043 A1 | 2/2011 | Anupindi et al. |
| 2014/0028089 A1 | 1/2014 | Luke et al. |
| 2015/0042285 A1 | 2/2015 | Doerndorfer |

FOREIGN PATENT DOCUMENTS

| CN | 102832657 A | 12/2012 |
| CN | 104348206 A | 2/2015 |

(Continued)

OTHER PUBLICATIONS

Machine Translation CN104348206A (Year: 2015).*
(Continued)

*Primary Examiner* — Nictoria H Lynch
(74) *Attorney, Agent, or Firm* — Michael Best & Friedrich LLP

(57) ABSTRACT

The invention relates to system for storing a battery (3), wherein the system at least one battery (3) comprising at least one battery cell and a battery control (2), central control means (1) and a central voltage supply (5), wherein the battery control (2) is signal-conductively connected to the central control means (1) and the battery control (2) is fed by the central voltage supply (5).

18 Claims, 1 Drawing Sheet

(51) Int. Cl.
 H01M 10/46 (2006.01)
 H01M 10/48 (2006.01)
 H02J 7/00 (2006.01)
 H01M 50/20 (2021.01)
(52) U.S. Cl.
 CPC .......... *H01M 10/46* (2013.01); *H01M 10/48* (2013.01); *H01M 50/20* (2021.01); *H02J 7/0022* (2013.01); *H02J 7/0069* (2020.01); *H01M 2010/4271* (2013.01); *H01M 2010/4278* (2013.01); *Y02T 10/70* (2013.01)

(56) References Cited

FOREIGN PATENT DOCUMENTS

| | | |
|---|---|---|
| DE | 102011115825 A1 | 4/2013 |
| DE | 102012015522 A1 | 2/2014 |
| DE | 102014216745 A1 | 3/2015 |
| EP | 2579382 | 4/2013 |
| EP | 2975724 | 1/2016 |
| JP | 2014138508 A | 7/2014 |
| JP | 2016171061 A | 9/2016 |

OTHER PUBLICATIONS

Machine Translation CN102832657A (Year: 2012).*
International Search Report for Application No. PCT/EP2017/078523 dated Apr. 13, 2018 (English Translation, 5 pages).

* cited by examiner

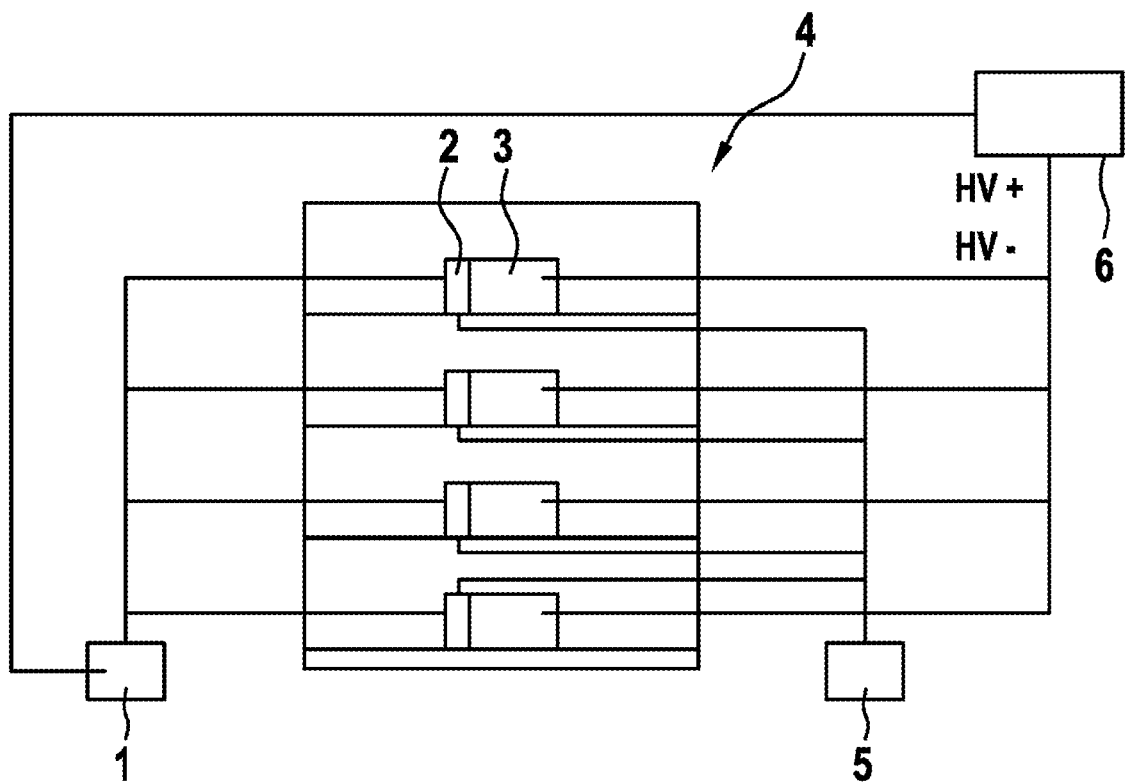

SYSTEM AND METHOD FOR STORING A BATTERY

BACKGROUND OF THE INVENTION

The present invention relates to a system and a method for storing a battery.

Rechargeable batteries are employed in increasing numbers. Fields of application include electromobility, for example in electric vehicles and/or hybrid vehicles, and/or stationary energy stores, for example in wind power installations or solar energy installations. If batteries are to be replaced, it may be necessary to place the latter in interim storage, in order to permit the re-use thereof at a later date in another application. At present, batteries to be stored are simply packaged, and are stored with no direct monitoring.

SUMMARY OF THE INVENTION

The invention proceeds from a system for the storage of a battery, wherein the working capacity and the functional capability of the battery are to be maintained during storage.

A core element of the invention is provided in that the system comprises at least one battery, having at least one battery cell and a battery control, a central control means and a central voltage supply,
- wherein the battery control is signal-conductively connected to the central control means, and
- wherein the battery control is fed by the central voltage supply.

According to the principle of the invention, the battery is controllable and monitorable by means of the local battery control. The battery control is fed by the central voltage supply. Accordingly, during storage, the battery control is not supplied by the battery itself, and can be operated independently of the state of the battery.

The battery control is actuated by the central control means.

Advantageously, the switch-on and read-out of the battery control can be executed by the central control means at regular time intervals.

Advantageously, the status of the battery can thus be monitored at regular time intervals, and the loading and resulting ageing of the battery and the battery control can be reduced.

Further advantageous forms of embodiment of the present invention are the subject matter of the sub-claims.

According to one advantageous configuration, the battery control comprises a storage means for the storage of status data concerning the battery, specifically:
- an identification number and/or
- a fault status and/or
- a capacity and/or
- a state of charge and/or
- a cell voltage and/or
- a cell temperature.

Advantageously, status data for the battery can be read out at regular time intervals by means of the battery control, and can be saved in the storage means. Advantageously, the storage means can be configured in the form of a non-volatile memory, for example an EEPROM or a flash memory, such that status data are immediately accessible further to the switch-on of the battery control.

In an advantageous configuration, the central control means is designed to evaluate status data for the battery and/or to execute a comparison with a limiting value, wherein, in the event of an overshoot and/or undershoot of the limiting value, a safety function can be executed by the central control means. A defective battery can thus be recognized by the central control means. The defective battery can be identified and eliminated from the store. Storage costs are reduced accordingly.

Advantageously, the safety function comprises:
- a switch-off of the battery and/or of the battery control, and/or
- a charging of the battery, and/or
- a discharging of the battery, and/or
- a rapid discharging of the battery, and/or
- the activation of a safety mechanism of the battery, specifically a pressure-relief valve and/or a cooling mechanism.

It is further advantageous if the central voltage supply is configured as a low-voltage supply, specifically as a 24 V supply or as a 12 V supply. As a result, only the voltage which is required for the operation of the battery control is supplied. A complex high-voltage supply for the battery can be omitted.

In a further advantageous configuration, the system additionally comprises a charging device for the charging and/or discharging of the battery. Advantageously, the charging device is configured as a high-voltage supply. Advantageously, the charging device is only switched on if the battery is being charged or discharged.

Preferably, the battery control can be switched on and/or switched off by the central control means wherein, specifically, the battery control can be switched from an active mode to a standby mode. The loading, and the resulting ageing, of the battery control can thus be reduced, in comparison with continuous duty.

The system advantageously comprises a location device, in which the battery is arranged, wherein the location device incorporates a contact point, and wherein the contact point is suitable for the connection of the battery control to the central control means and/or to the central voltage supply. Advantageously, the contact point is configured as a plug-in connecting part or a clip-on connecting part, such that the connection of the battery control to the central control means can be executed in a rapid and secure manner.

According to a further advantageous form of embodiment, the system comprises a plurality of batteries, wherein each battery has a respective battery control, and wherein the respective battery control is signal-conductively connected to the central control means. This has an advantage, in that a plurality of batteries in the system can be monitored and controlled by means of a single central control means.

It is further advantageous if the battery controls are connected to the central control means by means of a bus system. The battery controls and the central control means are thus interconnected by a secure communication system.

The bus system is preferably configured as a master-slave system, wherein the central control means functions as the master unit and the battery controls as the slave units. Advantageously, the battery controls are actuatable by the central control means, and specifically can be switched on and/or switched off.

A core element of the invention, in the method for the storage of a battery by means of a system, specifically as described heretofore or according to one of the claims relating to the system, is that the method comprises the following process steps, wherein:
- in a first process step, the central control means prompts the battery control to transmit status data for the battery to the central control means;

in a second process step, the battery control transmits the requested status data to the central control means;

in a third process step, the central control means evaluates status data for the battery;

in a fourth process step, in the event of an overshoot and/or undershoot of a respective critical limiting value by the status data for the battery, a safety action is executed by the central control means.

The background to the invention is a method whereby the battery is controllable and monitorable by means of the local battery control.

The battery control is actuated by the central control means. Advantageously, the read-out of the battery control can be executed by the central control means at regular time intervals.

Further advantageous forms of embodiment of the present invention are the subject matter of the sub-claims relating to the method.

It is further advantageous if, in a fifth process step, the battery control is deactivated by the central control means wherein, specifically, the battery control is switched from the active mode to a standby mode. Accordingly, the battery control is only switched on when the central control means communicates with the battery control, or the battery control controls the battery.

To this end, in advance of, or simultaneously with, the first process step, the battery control is preferably activated by the central control means.

Advantageously, the battery control is switched from a standby mode to an active mode. In standby mode, the battery control is designed to receive instructions, specifically an alarm call, from the central control means.

Advantageously, the loading, and the consequent ageing, of the battery and the battery control can be reduced, in comparison with a battery or battery control in continuous duty.

Preferably, in the first process step, selected status data are requested by the central control means. The transmission time for status data can be reduced accordingly.

Preferably, in the second process step, the battery control scans a storage means of the battery control, in which status data for the battery have been saved. Advantageously, the storage means can be configured as a non-volatile memory, for example an EEPROM or a flash memory, such that status data are immediately available upon the switch-on of the battery control.

Advantageously, in the third process step, status data are compared by the central control means with a limiting value which is assigned to the respective status data type. To this end, the central control means comprises a central storage means, in which the respective limiting value is saved.

Preferably, in the fourth process step, by way of a safety action, the battery is switched off and/or discharged and/or rapidly discharged and/or charged and/or a safety mechanism of the battery is activated.

It is further advantageous if the battery control is fed by a central voltage supply. Accordingly, during storage, the battery control is not supplied by the battery itself, and is operated independently of the state of the battery.

In an advantageous configuration, the central control means charges and discharges the battery at regular time intervals, wherein the battery is charged to a first value, which lies below a maximum limiting value, and is discharged thereafter to a second value, which lies above a minimum limiting value. The minimum limiting value and the maximum limiting value, and the time interval between two charging and discharging cycles, are selected in accordance with the state of the battery, for example in accordance with the age and the capacity of the battery. Advantageously, by means of controlled charging and discharging, the service life of the battery can be prolonged.

BRIEF DESCRIPTION OF THE DRAWINGS

In the following section, the invention is described with reference to exemplary embodiments, from which further inventive characteristics can be inferred which do not, however, limit the scope of the invention. The exemplary embodiments are represented in the drawings.

In the drawings:

FIG. 1 shows a schematic representation of the system according to the invention for storing a battery.

DETAILED DESCRIPTION

FIG. 1 represents the system according to the invention for storing a battery 3. The system for storing a battery comprises at least one battery 3, a central voltage supply 5, specifically a low-voltage supply, a central control means 1 and at least one location device 4 for the battery 3.

Preferably, the system for storing a battery 3 comprises a charging device 6, specifically a high-voltage charging device, for the charging and/or discharging of the battery cell. The charging device 6 is connected to the at least one battery 3, in an electrically conductive manner, by means of high-voltage lines. The charging device 6 is data-conductively connected to the central control means 1.

The location device 4 comprises a contact point, which is suitable for the connection of the battery control 2 to the central control means 1 and/or to the central voltage supply 5. For example, the contact point is configured as a plug-in connecting part, specifically as a three-pole plug-in connecting part for the connection of the battery control 2 to the central control means 1 and to the central voltage supply 5. Alternatively, the plug-in connecting part is configured to a five-pole design, wherein the plug-in connecting part is designed for the connection of the battery control 2 to the central control means 1 and to the central voltage supply 5, and for the connection of the battery 3 to the charging device 6 for the battery 3.

A battery 3 is to be understood here as a rechargeable battery, specifically an electrochemical battery cell and/or a battery module having at least one electrochemical battery cell and/or a battery pack having at least one battery module. The battery cell is configurable as a lithium-based battery cell, specifically a lithium-ion battery cell. Alternatively, the battery cell is configured as a lithium-polymer battery cell, or a nickel-metal hydride battery cell, or a lead-acid battery cell or a lithium-air battery cell or a lithium-sulfur battery cell.

The battery 3 comprises at least one battery control 2. The battery control 2 comprises a storage means, which is designed for the storage of status data for the battery 3, specifically for the storage of:

an identification number and/or
a fault status and/or
a capacity and/or
a state of charge and/or
a cell voltage and/or
a cell temperature.

The central voltage supply 5 is connected to the battery control 2 in an electrically conductive manner. The central voltage supply 5 is preferably configured as a central low-voltage supply, specifically as a 12 V supply.

The battery control 2 is designed for the control of all electrical functions of the system, specifically for the control of the charging and discharging of the battery 3, and/or for the monitoring of the battery 3.

The battery control 2 is signal-conductively connected to the central control means 1. The central control means 1 is designed for the switch-on and/or switch-off of the battery control 2.

A read-out of the storage means of the battery control 2 can be executed by the central control means 1. The data read-out from the storage means can be evaluated by means of an evaluation means of the central control means 1, and can specifically be statistically evaluated.

The central control means 1 comprises a central storage means, in which limiting values for comparison with status data for the battery 3 are saved. The central control means 1 is designed for the comparison of status data with a limiting value. In the event of an overshoot or an undershoot of a critical limiting value, the central control means 1 is designed to execute a safety function in response. A safety function includes, for example:
- a switch-off of the battery 3 and/or of the battery control 2, and/or
- a charging of the battery 3, and/or
- a discharging of the battery 3, and/or
- a rapid discharging of the battery 3, and/or
- the activation of a safety mechanism of the battery 3, for example a pressure-relief valve and/or a cooling mechanism.

In a preferred exemplary embodiment, the system according to the invention for the storage of a battery 3 is designed for the storage of a plurality of batteries 3. To this end, the batteries 3 are arranged in the location device 4.

Each battery 3 comprises at least one respective battery cell and a respective battery control 2, as described heretofore.

The battery controls 2 are fed by the central voltage supply 5. To this end, the battery controls 2 are connected to the central voltage supply 5 in an electrically conductive manner, wherein the battery circuits are configured in a parallel-connected arrangement.

The central control means 1 is signal-conductively connected to the battery controls 2. Preferably, the central control means 1 and the battery controls 2 are interconnected by means of a bus system, specifically a master-slave bus system. To this end, the battery controls 2 are addressed as slave units by means of their respective identification number, and are called up by the central control means 1 via the bus.

Preferably, a first bus telegram of the central control means 1 comprises an instruction for the switch-on of the respectively addressed battery control 2. Advantageously, by means of the first bus telegram, the respectively addressed battery control 2 is re-activated from a standby mode, in order to communicate with the central control means 1 via the bus.

A second bus telegram of the central control means 1 comprises an instruction for the switch-off of the respective battery control 2. Advantageously, by means of the second bus telegram, the respectively addressed battery control 2 is switched to a standby mode, once the communication with the central control means 1 is completed.

A method according to the invention for storing a battery 3 comprises the following, specifically temporally sequential process steps:

In a zeroth process step, the battery control 2 of the battery 3 is activated by the central control means 1 wherein, specifically, the battery control 2 is switched from a standby mode to an active mode.

In a first process step, the central control means 1 instructs the battery control 2 to transmit status data for the battery to the central control means 1. Either selected status data, or all available status data, are requested by the central control means 1.

Preferably, the zeroth process step and the first process step are executed simultaneously, specifically by means of a single bus telegram.

In a second process step, the battery control 2 executes a read-out of the storage means, and transmits the requested status data to the central control means 1.

In a third process step, the central control means 1 evaluates status data for the battery 3, specifically statistically. Preferably, status data are compared by the central control means 1 with a limiting value which is assigned to the respective status data type, for example, the state of charge of the battery is compared with a minimum state of charge.

In a fourth process step, in the event of an overshoot and/or undershoot of a respective critical limiting value by the status data for the battery 3, a safety action is executed by the central control means 1. By way of a safety action, for example, the battery 3 is switched off, and/or discharged, and/or rapidly discharged, and/or charged, and/or a safety mechanism of the battery is activated.

In a fifth process step, the battery control 2 is deactivated by the central control means 1 wherein, specifically, the battery control 2 is switched from the active mode to a standby mode.

Preferably, the method according to the invention is executed at regular time intervals.

Preferably, at regular time intervals, the central control means 1 executes charging and discharging cycles on the battery 3, specifically independently of a limiting value overshoot and/or limiting value undershoot of status data for the battery 3. To this end, the battery 3, in accordance with its capacity and its age, at regular time intervals, is charged to a first value, which lies below a maximum limiting value, and is discharged thereafter to a second value, which lies above a minimum limiting value.

The invention claimed is:

1. A system for storing a battery (3), the system comprising:
   at least one battery (3) having at least one battery cell and a battery control (2),
   a central controller (1) signal-conductively connected to the battery control (2) and
   a central voltage supply (5), the system being configured to
   in a first process step, prompt, via the central controller (1) of the system, the battery control (2) of the battery (3) to transmit status data for the battery (3) to the central controller (1),
   in a second process step, transmit, from the battery control (2), the requested status data to the central controller (1),
   in a third process step, evaluate, at the central controller (1), the status data for the battery (3); and
   in a fourth process step, in the event of an overshoot and/or undershoot of a respective critical limiting value by the status data for the battery (3), execute, via the central controller (1), a safety action, wherein the battery control (2) is fed by the central voltage supply (5)

wherein the battery control (2) comprises a storage for the storage of the status data for the battery (3), and wherein the safety action includes activating an overpressure valve and/or a cooling mechanism.

2. The system as claimed in claim 1, wherein the status data includes:
an identification number and/or
a fault status and/or
a capacity and/or
a state of charge and/or
a cell voltage and/or
a cell temperature.

3. The system as claimed in claim 2,
wherein the safety action comprises:
a switch-off of the battery (3) and/or of the battery control (2), and/or
a charging of the battery (3), and/or
a discharging of the battery (3), and/or
a rapid discharging of the battery (3).

4. The system as claimed in claim 1, wherein the central voltage supply (5) is configured as a low-voltage supply.

5. The system as claimed in claim 1,
the system further comprising a high-voltage charging device (6) for charging and/or discharging of the battery (3),
wherein the charging device (6) is data-conductively connected to the central controller (1),
wherein the charging device (6) is connected to the battery (3) in an electrically conductive manner by high-voltage lines.

6. The system as claimed in claim 1,
wherein the battery control (2) is switched on and/or switched off by the central controller (1) wherein the battery control (2) is switched from an active state to a standby mode.

7. The system as claimed in claim 1,
the system further comprising a location device (4), in which the battery (3) is arranged,
wherein the location device (4) incorporates a contact point, and wherein the contact point is suitable for the connection of the battery control (2) to the central controller (1) and/or to the central voltage supply (5).

8. The system as claimed in claim 1,
the system further comprises a plurality of batteries (3),
wherein each battery (3) has a respective battery control (2),
wherein the respective battery control (2) is signal-conductively connected to the central controller (1).

9. The system as claimed in claim 8,
the battery controls (2) are connected to the central controller (1) by a bus system,
wherein the bus system is configured as a master-slave system, wherein the central controller (1) functions as the master unit and the battery controls (2) as the slave units.

10. A method for storing a battery (3) by a system including
at least one battery (3) having at least one battery cell and
a battery control (2),
a central controller (1) signal-conductively connected to the battery control (2), and a central voltage supply (5), wherein the battery control (2) is fed by the central voltage supply (5), the method comprising the following process steps:
in a first process step, the central controller (1) of the system prompts the battery control (2) of the battery (3) to transmit status data for the battery (3) to the central controller (1);
in a second process step, the battery control (2) transmits the requested status data to the central controller (1);
in a third process step, the central controller (1) receives and evaluates the status data for the battery (3);
in a fourth process step, in the event of an overshoot and/or undershoot of a respective critical limiting value by the status data for the battery (3), a safety action is executed by the central controller (1);
wherein the central controller (1) charges and discharges the battery (3) at regular time intervals,
wherein the battery (3) is charged to a first value, which lies below a maximum limiting value, and is discharged thereafter to a second value, which lies above a minimum limiting value.

11. The method as claimed in claim 10,
the battery control (2) is activated by the central controller (1) simultaneously with the first process step,
wherein, the battery control (2) is switched from a standby mode to an active mode.

12. The method as claimed in claim 10, wherein in a fifth process step, the battery control (2) is deactivated by the central controller (1) wherein the battery control (2) is switched from an active mode to a standby mode.

13. The method as claimed in claim 10, wherein in the first process step, selected status data are requested.

14. The method as claimed in claim 10, wherein in the second process step, the battery control (2) executes a read-out of a storage of the battery control (2), in which the status data for the battery (3) have been saved.

15. The method as claimed in claim 10, wherein in the third process step, the status data are compared by the central controller (1) with a limiting value which is assigned to a respective status data type.

16. The method as claimed in claim 10, wherein in the fourth process step, by way of the safety action, the battery (3) is switched off and/or discharged and/or rapidly discharged and/or charged and/or a safety mechanism of the battery is activated.

17. The method as claimed in claim 10, wherein the system further comprises a plurality of batteries (3), wherein each battery (3) has a respective battery control (2), and wherein the respective battery control (2) is signal-conductively connected to the central controller (1).

18. The method as claimed in claim 17, wherein the battery controls (2) are connected to the central controller (1) by a bus system, wherein the bus system is configured as a master-slave system, wherein the central controller (1) functions as the master unit and the battery controls (2) as the slave units.

* * * * *